United States Patent

Dawson

[15] 3,635,234
[45] Jan. 18, 1972

[54] TEARABLE FILLING AND SEALING CLOSURE PLUG

[72] Inventor: Willis S. Dawson, Henderson City, Ky.
[73] Assignee: Cyanede Plastics, Inc., Henderson, Ky.
[22] Filed: June 12, 1970
[21] Appl. No.: 45,813

[52] U.S. Cl. ...................................137/68, 220/27
[51] Int. Cl. ...........................................F16k 13/04
[58] Field of Search.................220/27, 89 A; 137/68, 71

[56] References Cited

UNITED STATES PATENTS

| 2,553,267 | 5/1951 | Nedoh | 220/89 A |
| 3,039,482 | 6/1962 | Goldberg | 137/68 |
| 3,083,858 | 4/1963 | Biedenstein | 220/27 |
| 3,434,620 | 3/1969 | Laurizio | 220/27 |
| 3,478,761 | 11/1969 | Fox | 137/68 |

Primary Examiner—Joseph R. Leclair
Assistant Examiner—James R. Garrett
Attorney—Eliot S. Gerber

[57] ABSTRACT

A plastic resin closure plug is particularly adapted for insertion into a rigid panel of a structure which is to be filled with a foam insulation. The tubular shank portion of the plug fits within a hole of the panel and a flange portion of the plug lies on one side of the panel. The plug's top portion is connected to the shank portion by a web which is sufficiently thin so that it may be broken for insertion of a foaming nozzle. An integral hinge is provided connecting the top portion with the plug.

6 Claims, 4 Drawing Figures

PATENTED JAN 18 1972

3,635,234

INVENTOR.
WILLIS S. DAWSON

BY

Eliot S. Gerber
ATTORNEY

TEARABLE FILLING AND SEALING CLOSURE PLUG

The present invention relates to closure members and more particularly to a plastic resin closure plug for a rigid thin panel.

In the past, temperature insulation materials have taken various forms, for example, pressed waste wood and fiberglass bats. It has, however, been difficult to completely fill the spaces between curved panels or panels having reinforcing struts. In freezers and refrigerators, an increasingly used system is to fill the space between metal or other rigid panels with a foamed plastic resin insulation. In a typical foamed-in-place resin system a nozzle is inserted through a hole in a panel and a chemical liquid mixture injected therethrough. The liquid self-foams and fills all the available space between the panels. Upon the completion of the chemical reaction, a rigid or flexible insulating layer of foamed plastic resin is formed.

It is desirable that the closure plug, which may be used to fill a panel hole during shipment, may also be used as a cover over the hole during and after the placement of the insulation. It is further desirable that a one-way valve structure be provided for the entry of the foaming nozzle to prevent spillage of the foaming plastic from the filling hole.

It is the objective of the present invention to provide a one-piece closure plug which may be molded of plastic resin and which may be severed to act as a one-way valve and prevent foam insulation from spilling.

It is a further objective of the present invention to provide a closure plug which may be readily inserted and retained in holes in panels, although such holes are not accurate in size, for example, because they are misaligned when punched or drilled by automatic machinery.

It is still a further objective of the present invention to provide such a plug which may provide a complete cover for a hole or which may be partly severed to provide a one-way valve or whose top portion may be removed, leaving a grommet.

In accordance with the present invention a closure plug for a hole in a panel is molded as a one-piece integral unit from a suitable, somewhat flexible plastic resin, such as polyethylene. The plug includes a tubular shank portion whose outer wall is canted inward at the bottom to accommodate the plug to variations in hole sizes, and canted inward near the top to secure the plug in the panel. The plug has an annular flange portion having, in cross section, a flat bottom and a curved top; an annular connecting web and a dish-shaped concave-convex top portion. A hinge connects the top portion to the shank portion even after severing of the web.

Other objectives of the present invention will be apparent from its detailed description which follows, taken in conjunction with the accompanying drawings. In the drawings.

Figure 1:
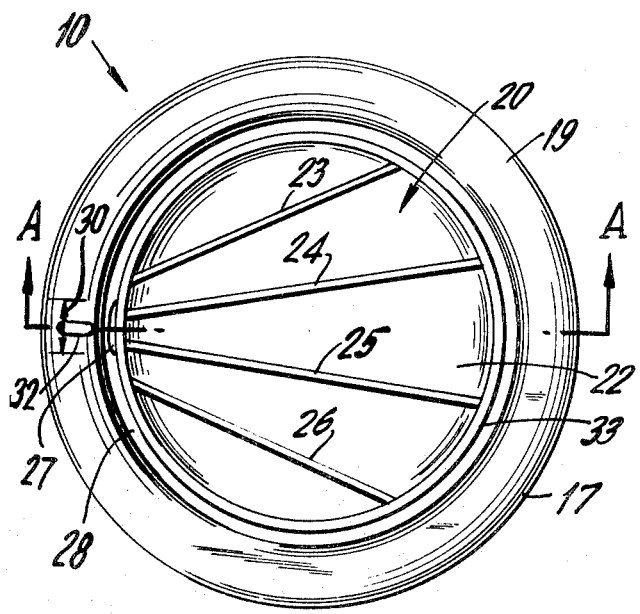
FIG. 1 is a top plan view of the closure plug of the present invention.
Figure 3:
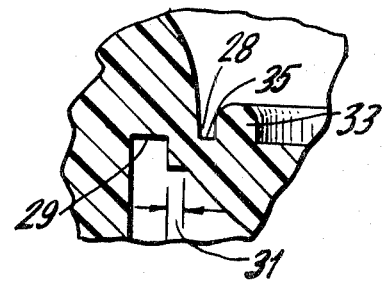
FIG. 3 is an enlarged side cross-sectional view of a portion of the said closure plug.
Figure 2:
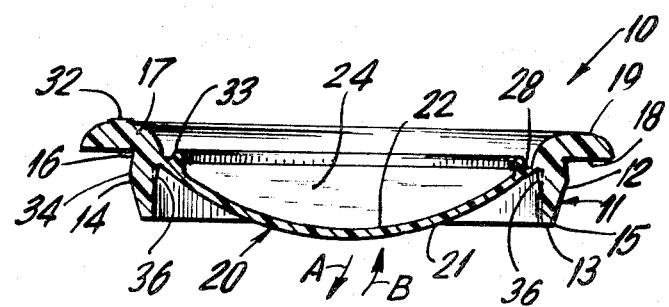
FIG. 2 is a side cross-sectional view taken along the line A—A of FIG. 1.
Figure 4:
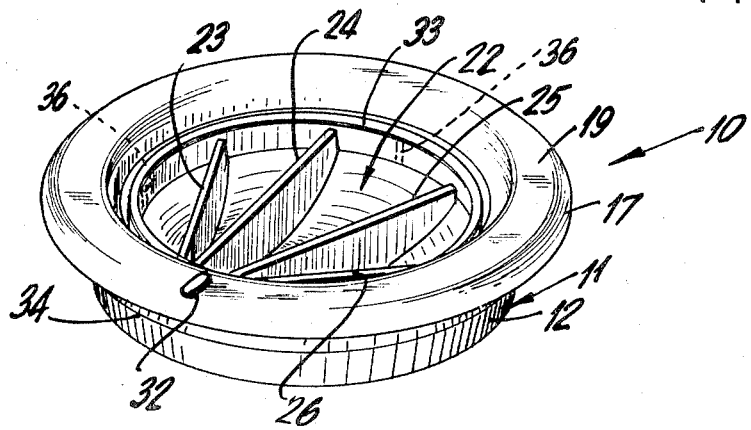
FIG. 4 is a perspective view of the closure plug of FIGS. 1–3.

As shown in FIGS. 1 to 3, the plug 10 of the present invention includes, as integral portions of a single-molded piece, a shank portion, a flange, a web, a hinge, and a top. The shank portion 11 is in the form of a tubular member having cylindrical sidewalls. The outer sidewall 12 is canted towards the bottom 13 of the sidewall. The outer diameter of the shank portion, at the point 34 would be, for example, 1.539 inch to be a press-fit through a hole of 1.5 inch in diameter. In contrast, the bottom of the shank portion, at point 15, has a diameter of 1.473 inch. This canted wall is necessary to provide adequate "lead-in" for easy insertion as the hole may not be made with an exact and accurate diameter.

The top portion of the shank 16 is canted inward toward the top so that it grips the thin panel. For example, the cant 16 may have a height of three sixty-fourths of an inch.

A flange 17 is provided at the top of the plug 10. The flange 17 is an annular member. The flange 17, at its radially inward side, is integral with the top of the shank portion. The bottom 18 of the flange is flat and adapted to lie on the top face of the panel. The upper surface 19 of the flange is curved in cross section. Such curved cross section provides a lead-in for foaming nozzles and a smooth surface in the event that cable or wires are placed through the opening and the cable and wire runs over the curved surface 19.

The plug 10 has a top portion 20 having a convex side 21 directed downward into the hole in which the closure member is positioned, and a concave face 22 facing away from that hole. The concave side of the top 20 has a plurality of ribs 23, 24, 25 and 26 to provide a reinforcement stiffening for the top. The ribs prevent warpage, for example, under heat, and prevent collapse of the top under pressure. Preferably, as shown in FIG. 1, the ribs are directed outward from a hinge portion 27. The ribs may be omitted if such reinforcement is not required. The hinge portion is integral with the thin connecting web 28 connected at a shoulder 29 on the shank portion 11. The thin web 28 provides a means whereby the top portion 20 may be partly separated from the plug. The web 28, as shown in FIG. 3, is the line of connection between a shoulder 29 of the shank portion and an overlapping edge of the bottom shoulder 35 of the top portion. The hinge 27, after such separation, will support the top portion 20 as a flap, the flap being connected only at the hinge. The hinge 27 may have a width, as shown by the arrows 30, of three-sixteenth of an inch and its depth may be, as shown by the arrows 31 of FIG. 3, 0.010 inch, in addition to the thickness of the web.

A small protruding marking 32 is provided on the top of the flange surface 19 directly behind the hinge 27. The marking 32 enables the worker to see the hinge and to position the hinge at any desired location in the panel hole. An annular boss 33 is provided at the top edge of the top 20. The boss 33 has the same function as ribs 23, 24, 25 and 26 and can be positioned further outboard to help guide the top back into its seated position. On the internal wall of the shank portion a number (two or more) of tapered ribs 36 are used to assist in insuring that the flap returns to a closed position around the complete circumference.

The web, which is the connection between the shank portion and the top portion, is directly on the same level as the high point 34 of the shank. Any point above high point 34 is a retention point for the plug. This has two functional results: (1) the plug, when installed, is under compression slightly above point 34, due to pressure from the internal wall of the hole. Such pressure starts the stretch or cold flow of the web, which is the weakest or thinnest portion connecting the top portion. The cold flow does not weaken the plug sufficiently to harm its use as a simple closure device, but it does make the top portion easier to sever or partly sever from the plug. (2) After tearing of the web, the shoulder of the top portion will be able to be reseated on a larger surface due to the compression.

In operation, a worker places the plug 10 in a hole in a flat rigid panel, for example, the inner lining of a refrigerator. The part may be shipped or otherwise handled in that condition. The hinge is positioned as required for the particular application in the hole. To fill the refrigerator panel with foamed insulation, the worker pushes the top, breaking the web 28, for example, by using a ball peen hammer or, alternatively, by pushing against the top portion with the end of a nozzle. The nozzle is then inserted through an opening formed by the backward motion of the top, i.e., in the direction of the arrow A of FIG. 2. The liquid resin, for example, a two-part mixture of polyurethane foam forming resin, is injected from the nozzle to in between the panels and then the nozzle withdrawn. The liquid will chemically self-react and produce a foam which will rise and fill the space between the panels. The gases from the foam will exit through the hole without closing the valve. The rising level of the foam will then close the top portion 20, in the direction of arrow B, using the hinge 27 as the pivot for the top portion 20. The tapered ribs 36 will aid the top in reseating itself within the plug. The plug top portion 20 will then act as a seal and prevent the foamed insulating resin from spilling from within the panel.

Although the present invention has been described in connection with its use in foamed plastic resin in refrigerator panels, it will be understood that it is possible for the closure plug of the present invention to have other uses. For example, the plug may be used in connection with foamed plastic resin insulation in house units, for example, as insulation in the walls of house trailers. As another example, the plug may be used as a lining for holes in the metal panels of electrical work, in which case the curved surface 19 forms a grommet. In such electrical work it may be preferable for the entire top to be removed, that is, the top to be severed at its hinge as well as at its web. The closure plug may also be used as a one-way valve and employed, for example, as a vacuum vent in refrigerators or other products. In such uses, the top acts as a one-way gas valve to permit gas flow in the direction A of FIG. 2 by pivoting of the top portion on the hinge. The top portion 20 then closes, in the direction of arrow B, under the force of higher gas pressure on its bottom side 21. The higher gas pressure on its bottom side 21 may be atmospheric pressure and the lower gas pressure on side 22 may be a vacuum.

Modifications may be made in the present invention within the scope of the subjoined claims. For example, the shank length may be increased so that the plug would fit holes formed in plaster sheet rock or other panels used in building construction.

I claim:

1. A plug of a plastic resin material molded as an integral member and consisting of
    a tubular shank portion whose outer cylindrical wall is adapted to fit in a hole in a panel;
    a flange portion connected to said shank portion and being annular shaped and having a lower surface adapted to lie on the surface of said panel;
    a connecting web portion connected to said shank portion and being annular in shape and directed radially inward from said shank portion;
    a top portion connected to said web and forming a closure cover over said hole;
    and a hinge portion connected between said shank portion and said top portion, said hinge portion retaining said top as a one-way valve flap when the web portion is severed.

2. A plug as in claim 1 wherein said top is a concave-convex dish-shaped member with its convex side directed inward toward said hole.

3. A plug as in claim 2 wherein said top has integral cross-rib members for strength, said members directed across said concave side.

4. A plug as in claim 1 wherein an annular boss is positioned on the radial inside of said web and directed upward away from said hole.

5. A plug as in claim 1 and also including a boss on the plug near the said hinge to indicate the position of the hinge.

6. A plug as in claim 1 wherein the top of the said flange is curved in cross section to form a grommet having a curved top face upon the removal or opening of the said top portion.

* * * * *